(12) United States Patent
Vitek

(10) Patent No.: US 8,351,546 B2
(45) Date of Patent: Jan. 8, 2013

(54) SENSING DEVICE ORIENTATION IN WIRELESS NETWORKS

(75) Inventor: Clark A. Vitek, Portland, OR (US)

(73) Assignee: Aruba Networks, Inc., Sunnyvale, CA (US)

( * ) Notice: Subject to any disclaimer, the term of this patent is extended or adjusted under 35 U.S.C. 154(b) by 621 days.

(21) Appl. No.: 12/337,390

(22) Filed: Dec. 17, 2008

(65) Prior Publication Data
US 2010/0150060 A1 Jun. 17, 2010

(51) Int. Cl.
*H03K 9/00* (2006.01)
(52) U.S. Cl. ........................................ 375/316
(58) Field of Classification Search ................ None
See application file for complete search history.

(56) References Cited

U.S. PATENT DOCUMENTS

| | | | | |
|---|---|---|---|---|
| 6,043,778 | A * | 3/2000 | Froeberg et al. | 342/357.36 |
| 7,660,695 | B2 * | 2/2010 | Berg et al. | 702/150 |
| 7,660,860 | B2 * | 2/2010 | Yoon et al. | 709/206 |
| 2006/0056370 | A1 * | 3/2006 | Hancock et al. | 370/338 |
| 2006/0146765 | A1 * | 7/2006 | Van De Sluis et al. | 370/338 |
| 2007/0073482 | A1 * | 3/2007 | Churchill et al. | 701/220 |
| 2007/0253400 | A1 * | 11/2007 | Zumsteg | 370/350 |
| 2007/0262863 | A1 * | 11/2007 | Aritsuka et al. | 340/539.22 |
| 2008/0024363 | A1 * | 1/2008 | Van Toorenburg | 342/357.06 |
| 2008/0254822 | A1 * | 10/2008 | Tilley | 455/550.1 |
| 2009/0109894 | A1 * | 4/2009 | Ueda et al. | 370/315 |
| 2009/0284425 | A1 * | 11/2009 | Snow et al. | 343/703 |
| 2010/0278335 | A1 * | 11/2010 | Enge et al. | 380/45 |

OTHER PUBLICATIONS

ST LIS302DL, MEMS motion sensor 3-axis—+ 2g/+ 8g smart digital output "piccolo" accelerometer, Oct. 2008, Rev 4, p. 1-42.
ST FC30, MEMS functional sensor: smart 3D orientation and click detection standalone device, May 2008, Rev 1, p. 1-13.

* cited by examiner

*Primary Examiner* — Fan Ng
(74) *Attorney, Agent, or Firm* — Blakely, Sokoloff, Taylor & Zafman LLP

(57) ABSTRACT

Sensing installed orientation of an antenna or access node in a wireless digital network. According to one aspect of the invention, an orientation sensor such as a 2 or 3 axis accelerometer is provided in the access node. The orientation sensor may be attached to the access node housing, directly or through a substrate, attached to the main logic board of the access node, or may be mounted to an antenna. The orientation sensor may be mounted to the same substrate as is used to form an antenna, or may be mounted on a separate substrate. When associated with an antenna, such as the orientation sensor on the same substrate as the antenna, or co-located with the antenna such as inside the same package, the orientation of the antenna may be sensed. Orientation data on the access node and/or antenna may be transmitted to the controller for the access node, and/or to clients of the access node. This orientation information may be used for example to verify or validate installation and positioning, for example comparing the actual orientation to the desired orientation as stored in a database. The orientation information may be used in modeling and/or displaying access node coverage. In access nodes with selectable antennas, the orientation information may be used to switch antennas.

32 Claims, 3 Drawing Sheets

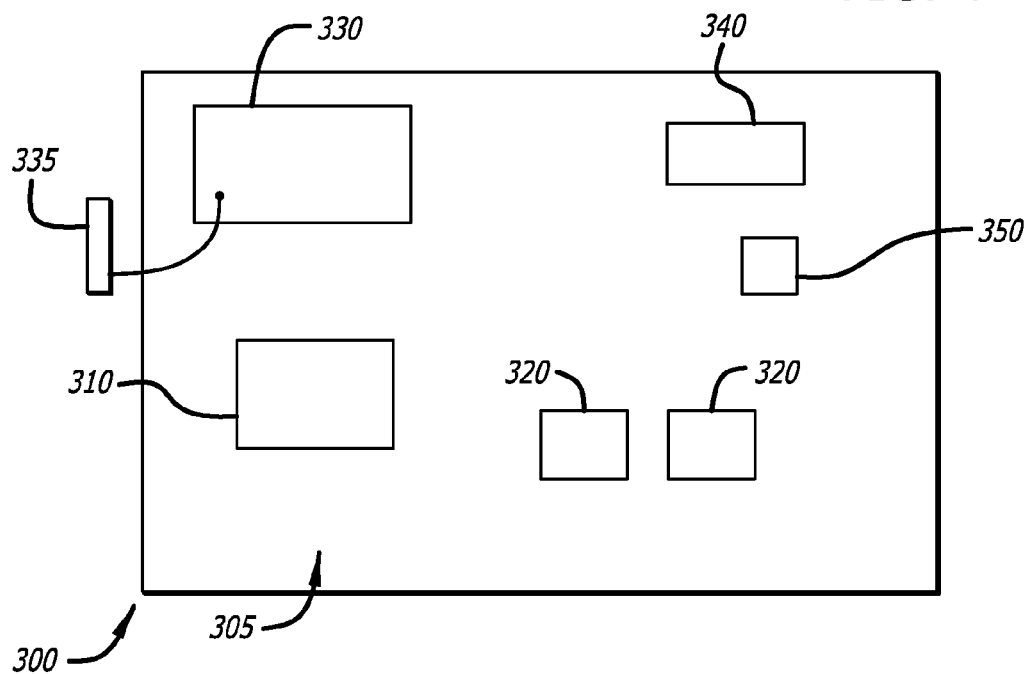
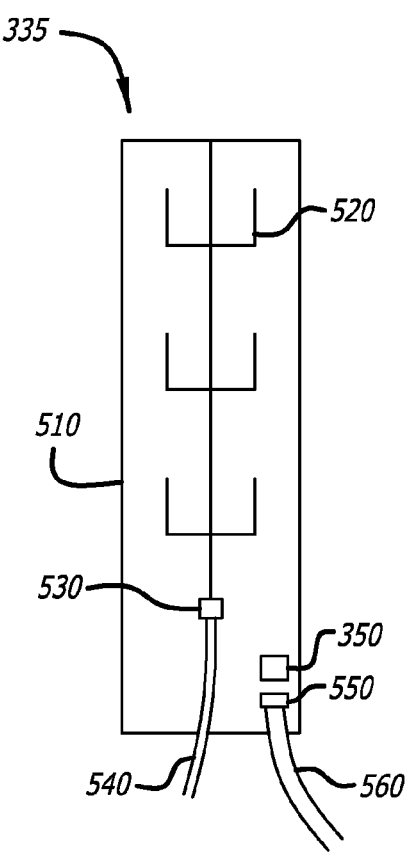

SENSING DEVICE ORIENTATION IN WIRELESS NETWORKS

BACKGROUND OF THE INVENTION

The present invention relates to wireless digital networks, and in particular, to the problem of sensing orientation of wireless access nodes and/or wireless antennas.

Modern wireless digital networks typically consist of one or more access nodes connected to a controller, and typically provide services to wireless clients according to IEEE 802.11 standards. Particularly with access nodes featuring one or more built-in antennas, differences in mounting and orientation may have significant effects on coverage and signal strength. Additionally, when two access nodes are linked together, antenna orientation and polarization should be the same.

Indoor access points, particularly those with integrated antennas, typically have two primary installation methods: wall mounted, or ceiling mounted. The differences in resulting antenna height and polarization between different mounting types and orientations may result in significant differences in coverage and signal strength.

In the case of a typical omnidirectional antenna, such as a dipole radiator, the free-space radiation pattern produced is similar to a donut, with the maximum radiation broadside to the dipole elements, and minimal radiation off the ends of the dipole elements. As an access node using such antennas is changed from a horizontal mounting orientation, such as mounted on a ceiling, to a vertical orientation such as a wall mount, the minima and maxima of antennas within it also change, as does the polarization of the electric field.

For example, a wall mounted access node can be designed to have an omnidirectional dipole antenna element that is vertically oriented with respect to the floor. This will produce a donut-shaped free-space radiation pattern with the body of the donut parallel to the floor as shown in FIG. 1. In this case the polarization of the electric field is also vertical with respect to the floor.

If this same access node is then installed on the ceiling without any mechanical change (i.e. articulating the antenna down), the free-space pattern will then be a vertically oriented donut as shown in FIG. 2 with a vertical electric field and a radiated pattern which is significantly different.

Similarly, when a pair of access nodes are used for example to provide a wireless point-to-point bridge between two locations, it is important that the antennas at both ends of the bridge have the same orientation and polarization to maximize received signal strength at both ends. If for example one node is installed with a vertically polarized antenna and the other node is installed with a horizontally polarized antenna, significant signal loss will result.

Because the orientation of the access node and its antenna or antennas affect signal strength and coverage, a way to sense the orientation of an installed access node and/or its antennas is desirable.

BRIEF DESCRIPTION OF THE DRAWINGS

The invention may be best understood by referring to the following description and accompanying drawings that are used to illustrate embodiments of the invention in which:

FIG. 4 shows an orientation sensor in an access node, and FIG. 5 shows an orientation sensor associated with an antenna.

DETAILED DESCRIPTION

Embodiments of the invention relate to methods and apparatus for sensing the installed orientation of an antenna or access node in a wireless digital network. An orientation sensor is mounted in the access node, or alternatively, the orientation sensor is coupled to one or more antennas associated with the access node. The orientation of the sensor is read by the access node and made available to clients of the access node or to the controller to which the access node is associated.

Figure 1:
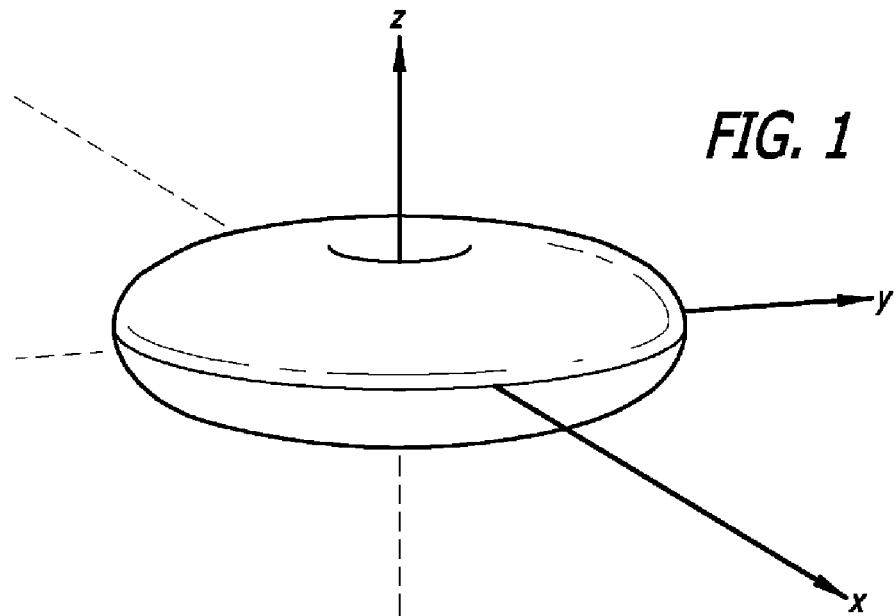
FIG. 1 shows the free-space radiation pattern of a vertically oriented omnidirectional antenna.
Figure 2:
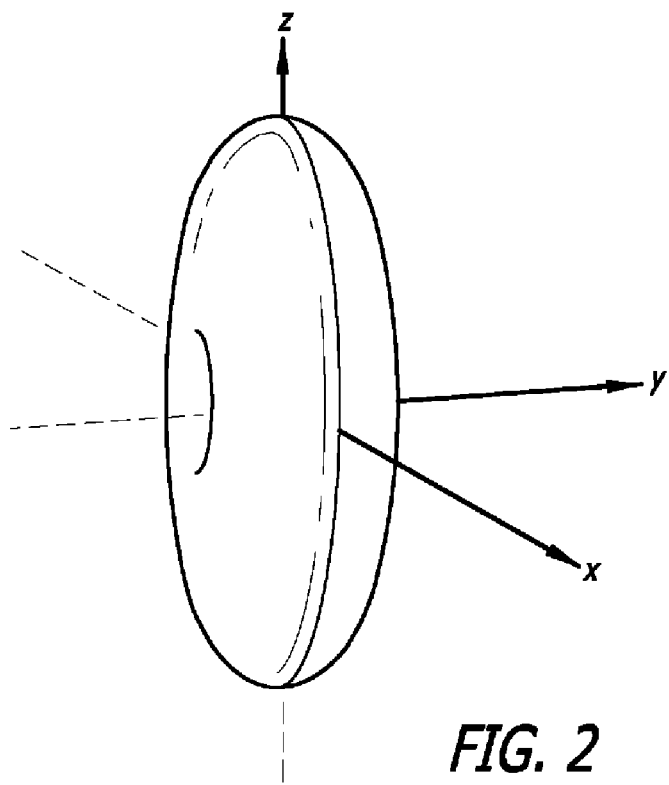
FIG. 2 shows the free-space radiation pattern of a horizontally oriented omnidirectional antenna.
Figure 3:
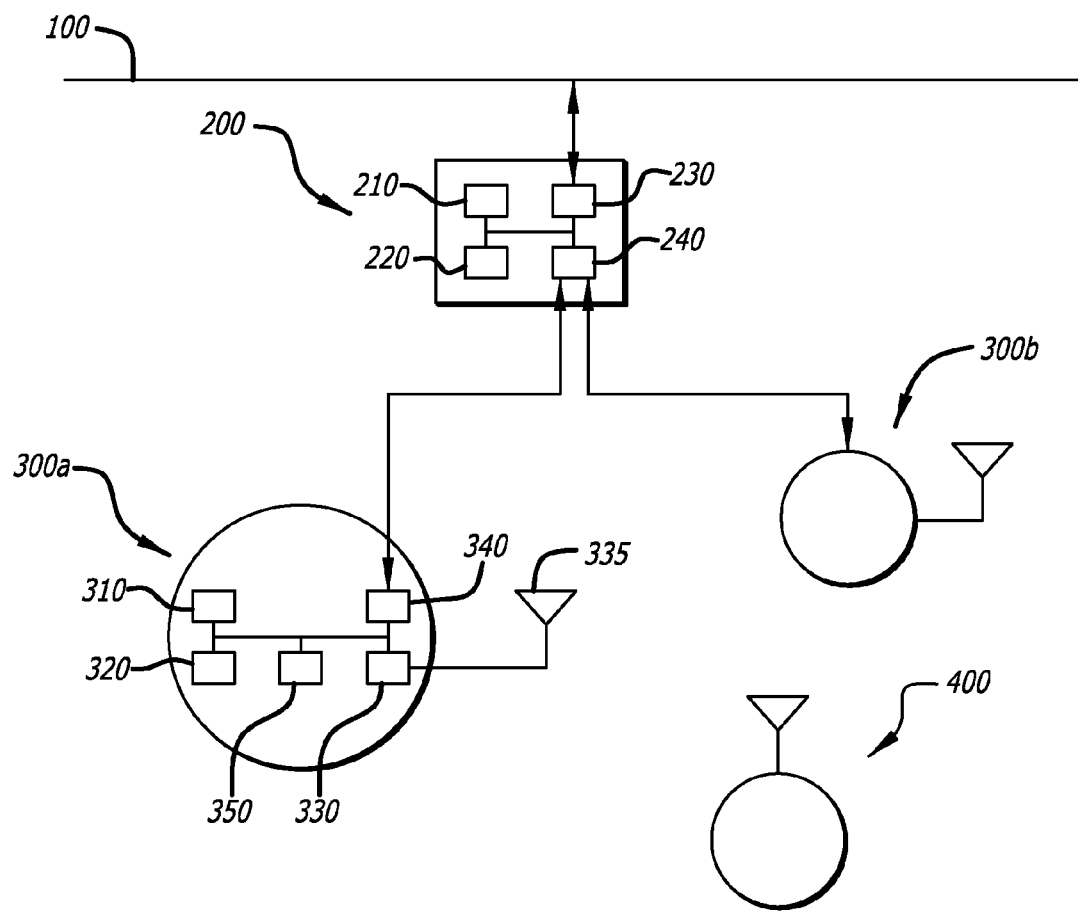
FIG. 3 shows a wireless digital network.

As shown in FIG. 3, a wireless network operating according to 802.11 standards supports connections of wireless clients 400 to a wired network. Wired network 100, such as a wired IEEE 802.3 Ethernet network, is connected to controller 200. Controller 200 supports connections 250 to access nodes 300a, 300b. These access nodes provide wireless communications to wireless client 400.

As is understood in the art, controller 200 is a purpose-built digital device having a CPU 210, memory hierarchy 220, and a plurality of network interfaces 230, 240. CPU 210 may be a MIPS-class processor from companies such as Raza Microelectronics or Cavium Networks, although CPUs from companies such as Intel, AMD, IBM, Freescale, or the like may also be used. Memory hierarchy 220 includes read-only memory for device startup and initialization, high-speed read-write memory such as DRAM for containing programs and data during operation, and bulk memory such as hard disk or compact flash for permanent file storage of programs and data. Network interfaces 230, 240 are typically IEEE 802.3 Ethernet interfaces to copper, although high-speed optical fiber interfaces may also be used. Controller 200 typically operates under the control of purpose-built embedded software, typically running under a Linux operating system, or an operating system for embedded devices such as VXWorks.

Similarly, as understood by the art, wired and wireless access nodes 300a, 300b are also purpose-built digital devices. These access nodes include CPU 310, memory hierarchy 320, and wireless interface 330 and wired interface 340. Wired interface 340 may be present but not used for direct communication with controller 200. As with controller 200, the CPU commonly used for such access nodes is a MIPS-class CPU such as one from Raza Microelectronics or Cavium Networks, although processors from other vendors such as Intel, AMD, Freescale, and IBM may be used. The memory hierarchy comprises read-only storage for device startup and initialization, fast read-write storage such as DRAM for holding operating programs and data, and permanent bulk file storage such as compact flash. Wireless access node 300 typically operate under control of purpose-built programs running on an embedded operating system such as Linux or VXWorks. Wireless interface 330 is typically an interface operating to the family of IEEE 802.11 standards including but not limited to 802.11a, b, g, and/or n. Wireless interface 330 is connected to antenna 335. At least one antenna is required for each band of operation. Some standards, such as draft 802.11n require multiple antennas per band of operation.

As an example, antenna 335 may be mounted in a fixed position inside the enclosure of access node 300. Or, antenna 335 may be rotatably mounted to access node 300 so that it may be extended or positioned away from the enclosure of access node 300 during operation. Or, antenna 335 may be mounted separately from access node 300, such as in the case of an external antenna.

According to an aspect of the invention, orientation sensor 350 is mounted in access node 300, and interfaced to CPU 310, either directly, or through glue logic understood to the art. Sensor 350 may be mounted for example on the main logic board of access node 300, or on a daughter board which is in turn mounted to the main logic board, subsidiary loc boards, or to the housing of access node 300. As shown in FIG. 4, access node 300 has components mounted to main logic board 305, such as CPU 310, memory 320, wireless interface 330, wired interface 340, and orientation sensor 350. As shown in FIG. 4, antenna 335 is attached via a cable.

While orientation sensor 350 may be a mechanical switch such as a conductive ball inside a cage of electrodes, a preferred orientation sensor is an integrated circuit sensor such as the LIS302DL 3-axis accelerometer from STMicroelectronics NV, the FC30 orientation sensor also from STMicroelectronics NV, or similar 2 or 3-axis sensors from companies such as Analog Devices, Bosch, Freescale Semiconductor, and others.

According to an aspect of the invention, the orientation of sensor 350 and therefore the orientation of access node 300 may be read as part of device initialization and startup, or may be read on a periodic basis, or on request from controller 200 or client devices 400, or a combination. In an access node having one or more fixed antennas 335, the orientation of access node 300 determines the orientation of the fixed antennas.

Orientation data on access node 300 may be used, for example, to verify installation orientation by comparing actual access node orientation to the orientation stored in a configuration database. Such a database may be put together during network planning and installation and feedback utilized to determine if the installed orientation is correct with respect to the intended installation plan. Orientation data on access node 300 may be also used to model and/or display propagation or coverage, for example to correctly display the predicted antenna coverage pattern visualization in three dimensions against measured signal levels obtained by radio frequency sensors.

In an embodiment with multiple antenna elements having different antenna patterns, orientation feedback data may also be used for example in processes that determine which antenna element to switch or "activate" to provide the most optimum pattern for the installation orientation. Such switching may be performed, for example, using PIN diode switches. PIN diodes for RF switching are made for example by Agilent Technologies, MA-COM Inc., and other semiconductor companies. At one extreme, antennas may be switched on device startup based on configuration information, or on command from controller 200. At the other extreme, antennas may be switched between transmit and receive, or on a per-packet basis.

According to another embodiment of the invention, orientation sensor 350 is associated with antenna 335. As shown in FIG. 5, antenna 335 is formed on a substrate 510 containing conductive traces 520 which form the elements of the antenna. Substrate 510 is typically printed circuit board material such as FR4, although other substrates may also be used. It is common in the antenna arts to place conductive traces 520 on both sides of substrate 510 to form antennas, although for some designs, only one side of substrate 510 may be needed. Antennas for multiple bands, for example the 2.4 GHz and the 5 GHz WiFi bands may be placed on the same substrate. A connection area 530 is provided for connecting antenna cable 540 to the conductive elements. Cable 540 is typically a miniaturized coaxial cable selected for operation at the frequency of the antenna.

According to the invention, orientation sensor 350 is also mounted to substrate 510, providing wiring between orientation sensor 350 and connection 550, which supports cable 560 providing electrical connections to the access node. Cable 560 is typically a flexible cable. Other components, such as power supply bypass capacitors, may also be located on substrate 510 to support orientation sensor 350, depending on the requirements of the particular orientation sensor used. As understood in the RF arts, care must be exercised in placing orientation sensor 350 and its supporting circuitry including but not limited to connection 550 and cable 560 so that these components do not significantly harm antenna performance.

According to another embodiment of the invention, rather than mounting orientation sensor 350 on the same substrate 510 forming antenna 335, orientation sensor 350 may be mounted on a separate substrate from antenna 335, and mechanically coupled to antenna 335 so that orientation sensor 350 and antenna 335 move together.

By associating orientation sensor 350 with an antenna 335, the orientation of the antenna may be sensed directly. This is useful in embodiments where antenna 335 is for example rotatably mounted to access node 300 so that it may be extended or positioned away from the body of access node 300 during use. It is also useful in embodiments where antenna 335 is external to access node 300, such as in the case of a high-gain directional antenna. As an example, a high-gain multi-element yagi-type antenna is quite directional in nature. A pair of such antennas used in a wireless bridge configuration must be placed in the same orientation, both horizontally or vertically polarized, for example, or significant signal losses will be incurred. By making use of antennas with orientation sensors, and reporting such orientation information back to controller 200 or to a program running on a client device, proper installation may be verified.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. A device comprising:
   one or more antennas;
   a processor;
   an orientation sensor communicatively coupled to the processor, the orientation sensor configured for generating orientation data of at least one component of the device without using signals received or transmitted by the one or more antennas,
   wherein the generated orientation data is used to determine a physical orientation of the at least one component in the device;
   wherein the generated orientation data of the at least one component of the device is used for one or more of:
      modeling signal propagation;
      modeling signal coverage;
      selecting an antenna pattern for the one or more antennas; or
      verifying installation of the device by comparing the generated orientation data with stored orientation data.

2. The device of claim 1 wherein the generated orientation data indicates an orientation of an antenna of the one or more antennas.

3. The device of claim 1, wherein the device is a wireless access node configured to receive and transmit the signals via the one or more antennas, wherein the signals are wireless signals.

4. The device of claim 1, wherein the orientation sensor is a mechanical switch or an accelerometer.

5. The device of claim 1, wherein the generated orientation data is read from the orientation sensor at device startup.

6. The device of claim 1, wherein the generated orientation data is used to select at least one antenna of the one or more antennas to activate for providing a particular antenna coverage pattern.

7. The device of claim 1, wherein the generated orientation data is read from the orientation sensor upon receipt of a command.

8. The device of claim 1 wherein the generated orientation data is used to select the antenna pattern for the one or more antennas.

9. The device of claim 1, wherein the generated orientation data is used to verify the installation of the device by comparing the generated orientation data to the stored orientation data.

10. The device of claim 1, further comprising:
a housing;
at least one logic board contained within the housing, the at least one logic board including:
a first interface that provides connectivity to a controller,
a second interface coupled to the one or more of antennas,
a processor coupled to the first interface;
wherein the device is configured to output the generated orientation data via the first interface or the second interface.

11. The device of claim 1, wherein the orientation sensor and the one or more antennas are mounted on a same substrate.

12. The device of claim 1, wherein the generated orientation data is detected prior to the device associating with another device.

13. The device of claim 1, wherein the generated orientation data is used for modeling signal propagation.

14. The device of claim 1, wherein the generated orientation data is used for modeling signal coverage.

15. A non-transitory computer readable storage medium comprising instructions which, when executed by one or more hardware processors causes performance of operations comprising:
generating, by an orientation sensor within a device, orientation data of at least one component of the device without using signals received or transmitted by one or more antennas of the device;
determining a physical orientation of the at least one component of the device based on the orientation data;
wherein the orientation data of the at least one component of the device is used for one or more of:
modeling signal propagation;
modeling signal coverage;
selecting an antenna pattern for the one or more antennas; or
verifying installation of the device by comparing the orientation data with stored orientation data.

16. The computer readable storage medium of claim 15, wherein the orientation data indicates an orientation of an antenna of the one or more antennas.

17. The computer readable storage medium of claim 15, wherein the device is a wireless access node configured to receive and transmit the signals via the one or more antennas, wherein the signals are wireless signals.

18. The computer readable storage medium of claim 15, wherein the orientation sensor is a mechanical switch or an accelerometer.

19. The computer readable storage medium of claim 15, wherein the orientation data is read from the orientation sensor at device startup.

20. The computer readable storage medium of claim 15, wherein the orientation data is used to select at least one antenna of the one or more antennas to activate for providing a particular antenna coverage pattern.

21. The computer readable storage medium of claim 15, wherein the orientation data is read from the orientation sensor upon receipt of a command.

22. The computer readable storage medium of claim 15, wherein the orientation data is used to select the antenna pattern for the one or more antennas.

23. The computer readable storage medium of claim 15, wherein the orientation data is used to verify the installation of the device by comparing the orientation data to the stored orientation data.

24. The computer readable storage medium of claim 15, wherein the operations further comprise outputting the orientation data via one or more of:
a first interface of the device that provides connectivity to a controller,
a second interface of the device coupled to the one or more antennas.

25. The computer readable storage medium of claim 15, wherein the orientation sensor and the one or more antennas are mounted on a same substrate.

26. The computer readable storage medium of claim 15, wherein the orientation data is detected prior to the device associating with another device.

27. The computer readable storage medium of claim 15, wherein the orientation data is used for modeling signal propagation.

28. The computer readable storage medium of claim 15, wherein the orientation data is used for modeling signal coverage.

29. A method comprising:
generating, by an orientation sensor within a device that includes one or more antennas, orientation data of at least one component of the device without using signals received or transmitted by the one or more antennas;
determining a physical orientation of the at least one component of the device based on the orientation data;
wherein the orientation data of the at least one component of the device is used for one or more of:
modeling signal propagation;
modeling signal coverage;
selecting an antenna pattern for the one or more antennas; or
verifying installation of the device by comparing the orientation data with stored orientation data.

30. The method of claim 29, wherein the orientation data is used to select the antenna pattern for the one or more antennas.

31. The method of claim 29, wherein the orientation data is used to verify the installation of the device by comparing the orientation data to the stored orientation data.

32. The method of claim 29, wherein the orientation data is used for modeling signal propagation or modeling signal coverage.

* * * * *